(12) United States Patent
Ku

(10) Patent No.: US 10,680,672 B2
(45) Date of Patent: *Jun. 9, 2020

(54) RECEIVER AND TRANSMITTER SWITCH CONSOLIDATION

(71) Applicant: SKYWORKS SOLUTIONS, INC., Woburn, MA (US)

(72) Inventor: Ryan Weichih Ku, Newbury Park, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/939,251

(22) Filed: Mar. 28, 2018

(65) Prior Publication Data
US 2018/0219574 A1 Aug. 2, 2018

Related U.S. Application Data

(63) Continuation of application No. 14/868,894, filed on Sep. 29, 2015, now Pat. No. 9,960,802.

(60) Provisional application No. 62/069,801, filed on Oct. 28, 2014, provisional application No. 62/069,250, filed on Oct. 27, 2014.

(51) Int. Cl.
*H04B 1/00* (2006.01)
*H04B 1/48* (2006.01)

(52) U.S. Cl.
CPC .................................... *H04B 1/48* (2013.01)

(58) Field of Classification Search
CPC .... H04B 1/0057; H04B 1/006; H04B 1/0064; H04B 1/0092
See application file for complete search history.

(56) References Cited

U.S. PATENT DOCUMENTS

| | | | | |
|---|---|---|---|---|
| 5,276,913 A | * | 1/1994 | Lee | H04B 1/44 455/76 |
| 2009/0093270 A1 | * | 4/2009 | Block | H04B 1/006 455/552.1 |
| 2011/0260806 A1 | * | 10/2011 | Takeuchi | H03H 7/38 333/103 |
| 2012/0063555 A1 | * | 3/2012 | Pullela | H04B 1/1638 375/350 |
| 2012/0243446 A1 | * | 9/2012 | Mueller | H04B 1/0057 370/280 |
| 2014/0349592 A1 | * | 11/2014 | Okazaki | H04B 1/50 455/75 |
| 2015/0304596 A1 | * | 10/2015 | Petrovic | H04N 5/50 348/731 |
| 2015/0311922 A1 | * | 10/2015 | Bakalski | H04B 1/006 455/552.1 |
| 2015/0341002 A1 | * | 11/2015 | Lee | H03F 3/211 455/571 |

* cited by examiner

*Primary Examiner* — Ping Y Hsieh
(74) *Attorney, Agent, or Firm* — Chang & Hale LLP

(57) ABSTRACT

A radio-frequency module includes a plurality of inputs and a plurality of outputs, each of at least two of the inputs of the plurality of inputs coupled to a separate output of the plurality of outputs through a separate single-pole-single-throw switch.

16 Claims, 9 Drawing Sheets

US 10,680,672 B2

RECEIVER AND TRANSMITTER SWITCH CONSOLIDATION

RELATED APPLICATIONS

This application is a continuation of U.S. patent application Ser. No. 14/868,894, filed Sep. 29, 2015, entitled DEVICES AND METHODS RELATED TO INTERFACES FOR RADIO-FREQUENCY MODULES, which claims priority to U.S. Provisional Application Nos. 62/069,250, filed Oct. 27, 2014 and entitled DEVICES AND METHODS RELATED TO INTERFACE FOR RADIO-FREQUENCY MODULE, and 62/069,801, filed Oct. 28, 2014 and entitled DEVICES AND METHODS RELATED TO INTERFACE FOR RADIO-FREQUENCY MODULE, the disclosures of which are hereby incorporated by reference in their entirety.

BACKGROUND

Field

The present disclosure generally relates to the field of electronics, and more particularly, to radio-frequency (RF) devices.

Description of Related Art

RF devices may include one or more transmit (TX) and/or receive (RX) paths. The design of such TX/RX paths can affect device size and/or layout complexity.

SUMMARY

In some implementations, the present disclosure relates to a radio-frequency (RF) module comprising a plurality of signal-conditioning circuits configured to condition RF signals, and an interface in communication with the signal-conditioning circuits, the interface including M inputs and N outputs, each of the quantities M and N greater than 1, the interface configured so that each of at least two of the M inputs is coupled to a separate output through a separate switch.

The RF module may be a front-end module (FEM). In certain embodiments, the RF signals include received RF signals. The signal conditioning circuits may include band pass filters. In certain embodiments, at least some of the band pass filters are implemented as duplexers. The RF module may further comprise an antenna switch configured to route the received RF signals from an antenna port to their respective duplexers. The RF module may further comprise a power amplifier configured to provide amplified RF signals to their respective duplexers for transmission through the antenna port.

In certain embodiments, the quantity M for the number of inputs is greater than or equal to the quantity N for the number of outputs. In certain other embodiments, the quantity M is equal to the quantity N. The quantity N for the number of outputs may be greater than or equal to 5. In certain embodiments, the quantity N for the number of outputs is greater than or equal to 7. The quantity N for the number of outputs may be greater than or equal to 10.

In certain embodiments, the separate switch includes a single-pole-single-throw (SP1T) switch. The interface may be a receive (RX) interface. Alternatively, the interface may be a transmit (TX) interface.

In some implementations, the present disclosure relates to a wireless device comprising a transceiver configured to process RF signals and an RF module in communication with the transceiver, the RF module including a plurality of signal-conditioning circuits configured to condition the RF signals, the RF module further including an interface in communication with the signal-conditioning circuits, the interface including M inputs and N outputs, each of the quantities M and N greater than 1, the interface configured so that each of at least two of the M inputs is coupled to a separate output through a separate switch. The wireless device may further comprise an antenna in communication with the RF module, the antenna configured to receive the RF signals.

The wireless device may further include a circuit board having the RF module mounted thereon. In certain embodiments, the circuit board further includes a layout of signal paths configured to mate with at least some of the N outputs of the interface. The layout of signal paths may include at least one consolidation of two or more signal paths connected to their respective ones of the N outputs. In certain embodiments, each of the respective ones of the N outputs connected to the consolidated signal paths is coupled to the corresponding input through the separate switch. The wireless device may be a cellular phone.

According to some teachings, the present disclosure relates to an interface architecture for radio-frequency (RF) filters. The interface architecture includes a plurality of inputs and a plurality of outputs. Each of at least two of the inputs is coupled to a separate output through a separate switch.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

DESCRIPTION

The headings provided herein, if any, are for convenience only and do not necessarily affect the scope or meaning of the claimed invention.

Figure 1:
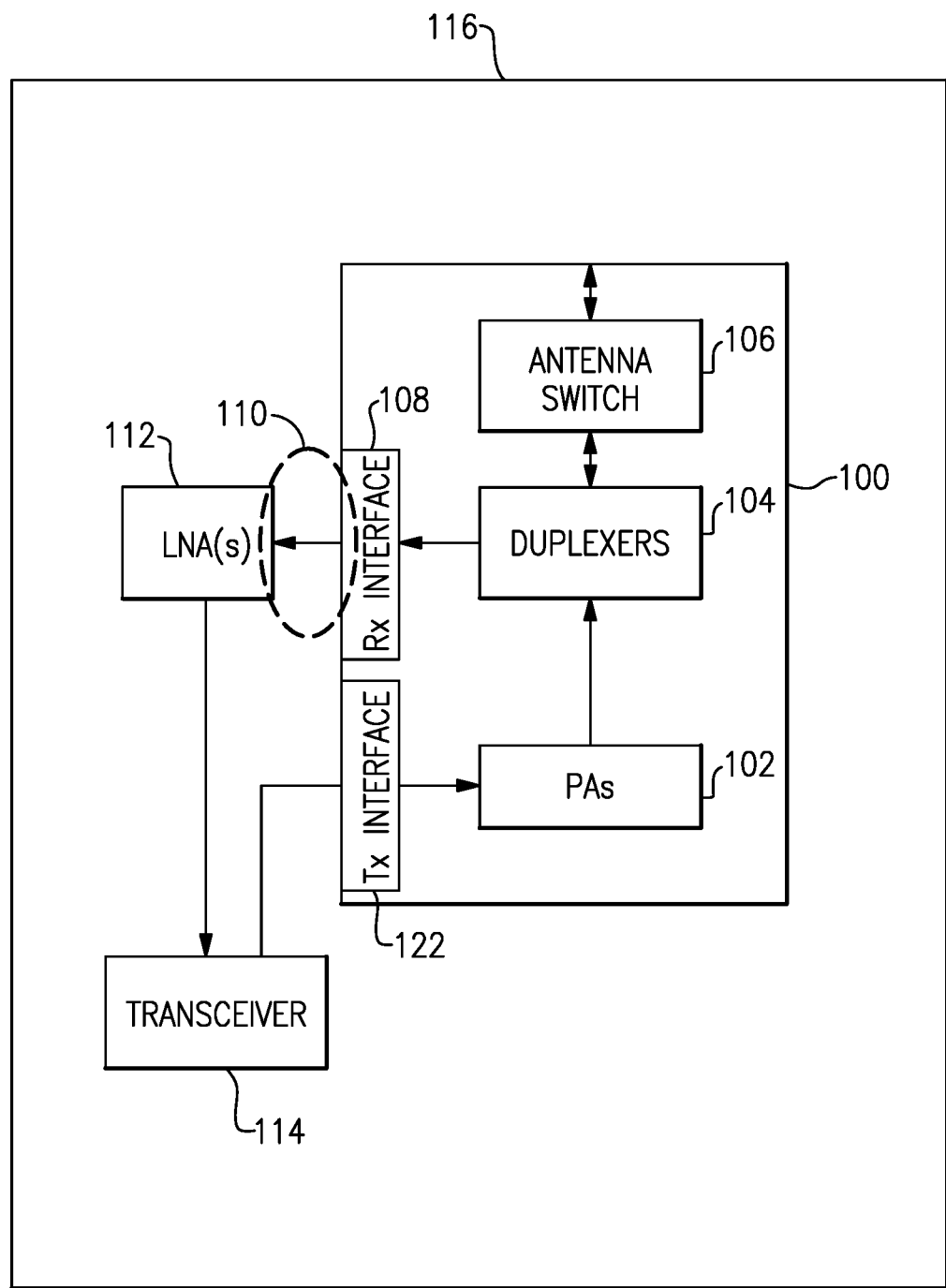
FIG. 1 shows a radio-frequency (RF) module implemented on a circuit board according to one or more embodiments.

FIG. 1 depicts a radio-frequency (RF) module 100 having an interface 108 (such as a receiver (RX) interface) that allows improved flexibility in how the RF module 100 can be implemented on a circuit board 116 such as a phone board. A region indicated as 110 can include different configurations of RX paths implemented by a circuit board design, and the interface 108 can accommodate such different RX-path configurations. Accordingly, a given implementation of the RF module 100 can be utilized in different circuit board design. The RF module 100 may further include a transmitter (TX) interface 122. Although various examples are described herein in the example context of RX and/or TX interfaces, it will be understood that one or more features of the present disclosure can also be utilized in other types of input/output (I/O) applications.

In the example of FIG. 1, the RF module 100 is depicted as a front-end module (FEM) including duplexers 104 (also referred to as FEMiD module). Such a module can include a plurality of power amplifiers (PAs) 102 configured to amplify RF signals from a transceiver 114. An amplified RF signal can pass through a corresponding one of the duplexers 104, and be routed to an antenna through an antenna switch 106. In some embodiments, the same antenna can be utilized to receive an RF signal, and such a received signal can be routed to a low-noise amplifier (LNA) 112 through a corresponding one of the duplexers 104 and the RX interface 108. The amplified signal output from the LNA 112 is shown to be routed to the transceiver 114 for further processing.

Figure 2:
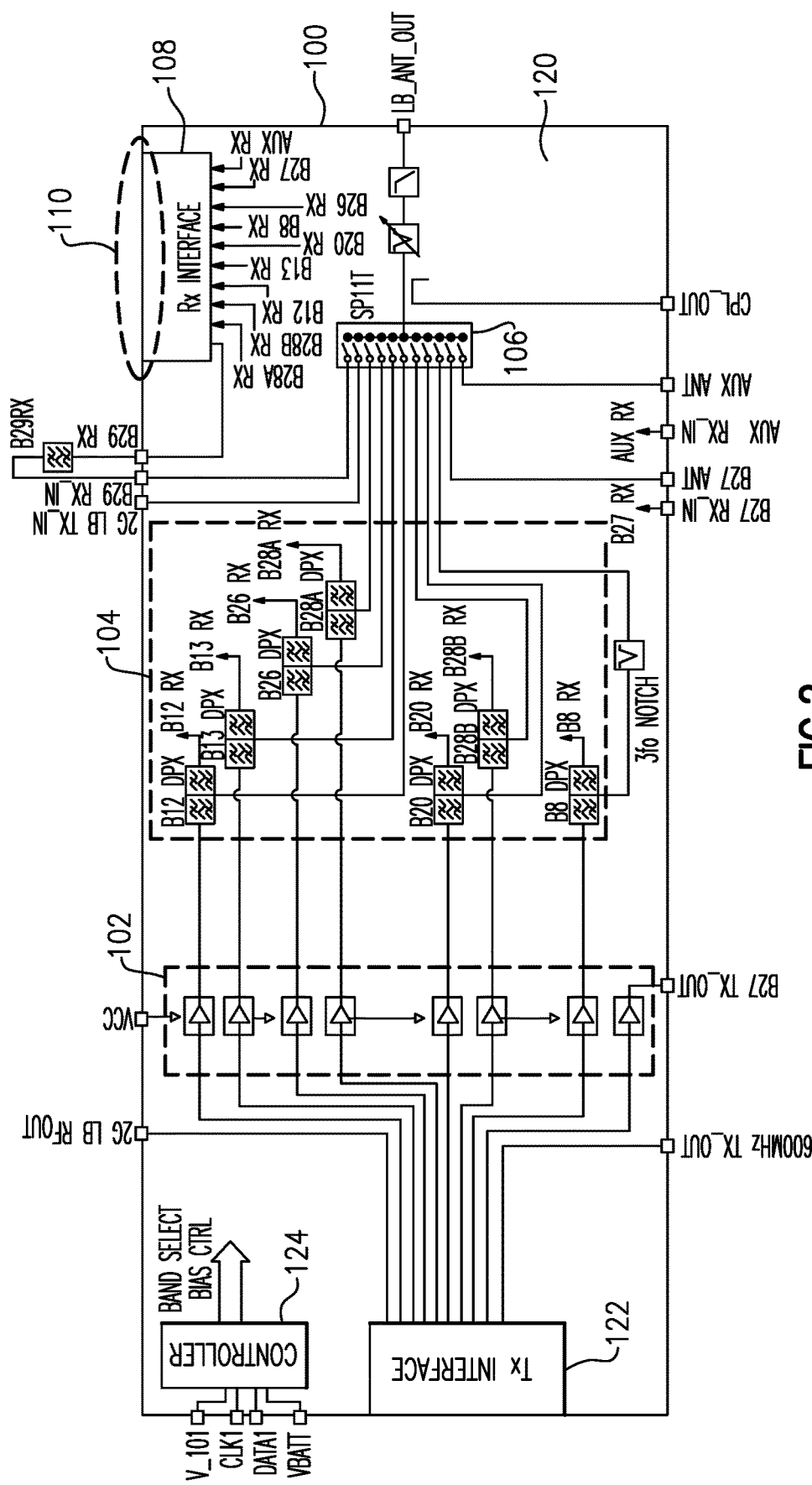
FIG. 2 shows an RF module according to one or more embodiments.

FIG. 2 shows a more detailed example of the FEM 100 of FIG. 1. The PAs are generally indicated as a dashed box 102, the duplexers are generally indicated as a dashed box 104, and the antenna switch is indicated as 106. In some embodiments, the FEM 100 can be implemented on, for example, a packaging substrate 120, such as a laminate substrate. Such an FEM can also include, for example, a band-selection switch 122 configured to allow selection of a band for TX operation. The FEM 100 can also include a controller 124 configured to provide and/or facilitate a number of control functionalities associated with the various components of the FEM 100.

In the example of FIG. 2, the duplexers are depicted as an assembly of a B12 duplexer (B12 DPX), a B13 DPX, a B26 DPX, a B28A DPX, a B20 DPX, a B28B DPX, and a B8 DPX. Such duplexers can provide their RX outputs to the RX interface 108. The RX interface 108 can also receive RX signals from non-duplexer sources. For example, a B29 RX signal is shown to be received from the common antenna and routed to the RX interface 108 through the antenna switch 106 and a B29 RX filter that is external to the FEM module 100. In another example, B27 RX and Aux signals are shown to be received through their respective antennas and routed to the RX interface 108. Accordingly, the example inputs for the RX interface 108 are shown to include B29 RX, B28A RX, B28B RX, B12 RX, B13 RX, B20 RX, B8 RX, B26 RX, B27 RX, and Aux RX. It will be understood that an RX interface 108 can be configured to route other band signals, and any references herein to particular band signals should be understood to be applicable to any suitable or practical band/channel.

In some RF applications, signals associated with a number of bands can be processed through a common path. For example, an LNA can be configured to process different band signals that have similar frequency ranges. A broadband LNA can be configured to process band signals in more separated frequency ranges. In some embodiments, such a broadband LNA can also be utilized for carrier-aggregation applications where two or more bands having sufficiently separate frequency ranges can be processed together. The use of multiple TX and/or RX paths may necessitate various matching networks and/or complex RF path layout in the module 120. While dedicated matching networks may enable optimization of individual bands, such configurations may present certain disadvantages in size and/or layout constraint/complexity. The routing of RX and/or TX paths may be determined at least in part by the types and/or configurations of RX and/or TX interface circuitry implemented to interact with one or more inter-module components and/or circuit board traces/devices. In certain embodiments, a plurality of RX and/or TX signals may be consolidated on a single transmission path. However, a single dedicated consolidation may not work for all platforms/customers, and so configurations allowing for flexible reconfiguration of the RX and/or TX port mapping may be desirable.

Certain embodiments disclosed herein provide for the utilization of multiple single-pull single-throw (referred to herein as "SP1T" or "SPST") switches that may be wired together in various combinations as needed or desired within the RF module or external to the RF module on an associated circuit board. When the various SP1T switches are open, the parasitic loss(es) may be relatively low, wherein the open switch(es) generally appear as an open circuit to the active path that is engaged/selected. Certain embodiments provide a flexible radio board layout wherein one or more of the TX and/or RX paths may be combined, as desired, such that a single module may be used in multiple different configurations across platforms, customers and/or products.

Receiver Interface

Figure 3:
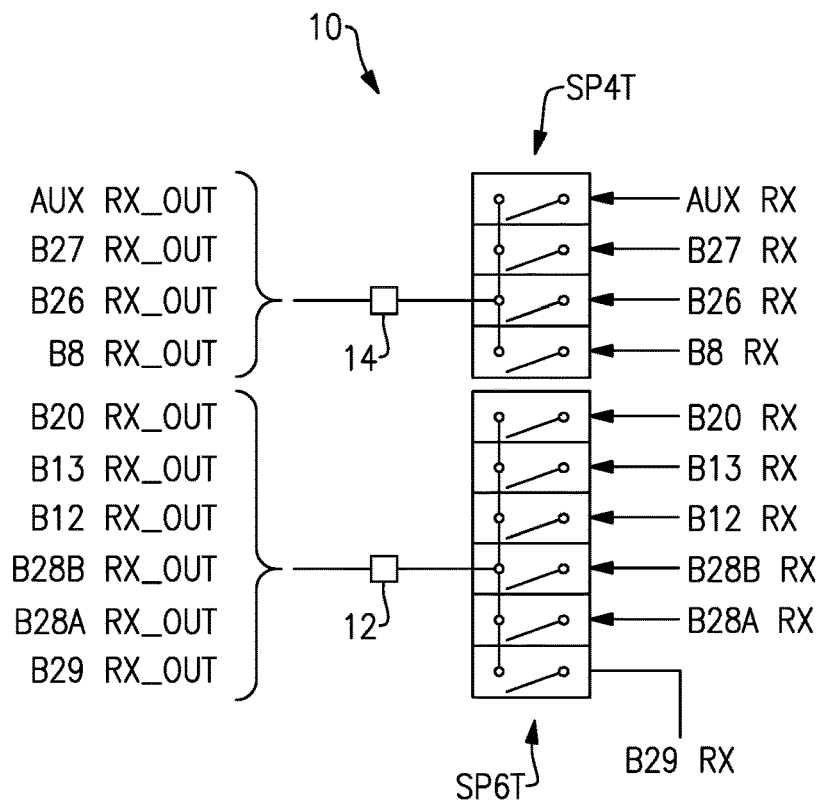
FIG. 3 shows example RF interface circuitry according to one or more embodiments.

Certain embodiments disclosed herein provide RF modules including an RX interface configured to enable flexible RX consolidation switching. For example, groups of frequency band paths may be consolidated together in dedicated poles of RX switches. FIG. 3 shows an example configuration 10 where the example RX inputs (B29 RX, B28A RX, B28B RX, B12 RX, B13 RX, B20 RX, B8 RX, B26 RX, B27 RX, and Aux RX) are routed to two consolidated RX outputs for further processing. The signal(s) may be received at an antenna of an RF module, wherein the received signal(s) are passed through a duplexer that provides the signal(s) to the RX interface. In FIG. 3, the RX inputs B29 RX, B28A RX, B28B RX, B12 RX, B13 RX, B20 RX are shown to be consolidated to a single output pin 12 by, for example, a SP6T switch. Among such consolidated bands, a given band can be selected for operation by closing the corresponding throw and opening the other throws. Similarly, the RX inputs B8 RX, B26 RX, B27 RX, Aux RX are shown to be consolidated to a single output pin 14 by, for example, a SP4T switch. Among such consolidated bands, a given band can be selected for operation by closing the corresponding throw and opening the other throws.

In the example of FIG. 3, the RX output configuration of the interface 10 matches the consolidation of the two groups of bands on the example circuit board design. In circuit board designs, however, there may be variations in, for example, number of consolidation groups, band content of a given group, etc. With such variations, the example RX interface 10 of FIG. 3 typically cannot be utilized without at least some loss of functionality. Accordingly, the example consolidation configuration of FIG. 3 generally does not provide flexibility for use in a wide variety of RX output configurations. Furthermore, the parasitic losses associated with the SP4T and SP6T switches may be undesirably high relative to losses of, for example, SP1T switches.

Figure 4:
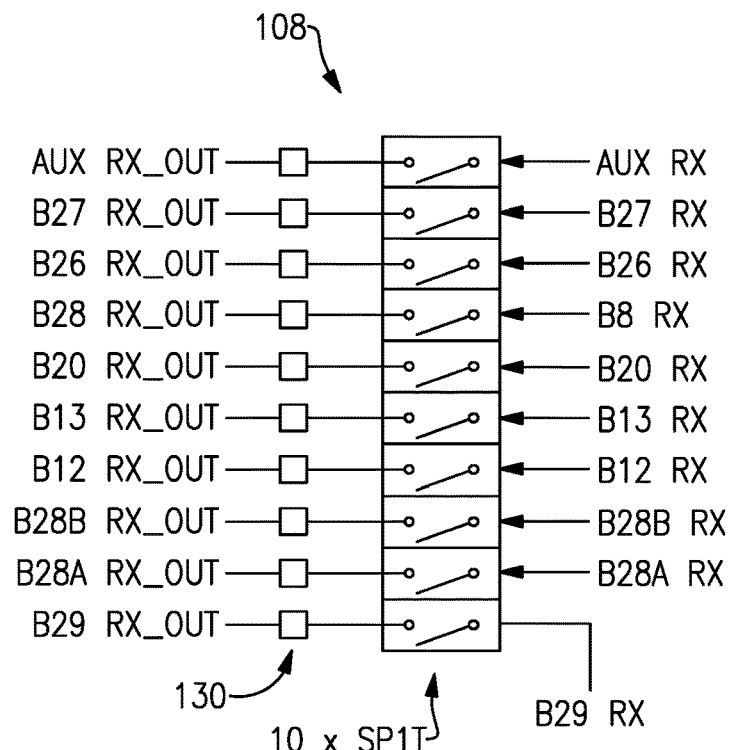
FIG. 4 shows example RF interface circuitry according to one or more embodiments.

FIG. 4 shows that in some embodiments, an RX interface 108 can be configured to provide increased flexibility for a wide variety of circuit board designs. Although the configuration of FIG. 3, wherein many different bands are handled on the same line, can provide certain benefits, such configuration may not provide the desired flexibility for tying certain bands together outside of the RX interface without the implementation of external switch(es), which can be expensive and/or present undesired complexity. Certain embodiments provide for separate RX interface input pins for each of a plurality of band signals, wherein each of the input pins is associated with a separate SP1T switch. The individual RX interface input pins may be flexibly connected/tied external to the RF module as needed for port mapping to meet desired configurations. The example RX interface 108 of FIG. 4 is shown to include a separate output pin (collectively indicated as 130) for each of the example RX inputs (B29 RX, B28A RX, B28B RX, B12 RX, B13 RX, B20 RX, B8 RX, B26 RX, B27 RX, and Aux RX). Control of routing through such separate output pins can be achieved by, for example, a single-pole-single-throw (SP1T) switch for each RX input. Accordingly, for the 10 example RX inputs (B29 RX, B28A RX, B28B RX, B12 RX, B13 RX, B20 RX, B8 RX, B26 RX, B27 RX, and Aux RX), 10 SP1T switches can be implemented to provide control of routing of one or more RX signals through the RX interface 108. Although certain bands/pins are illustrated, it should be understood that any configuration of bands and/or pins may be implemented within the scope of the present disclosure. For example, only a subset of the bands may be associated with separate pins/switches in certain embodiments.

Figure 5:
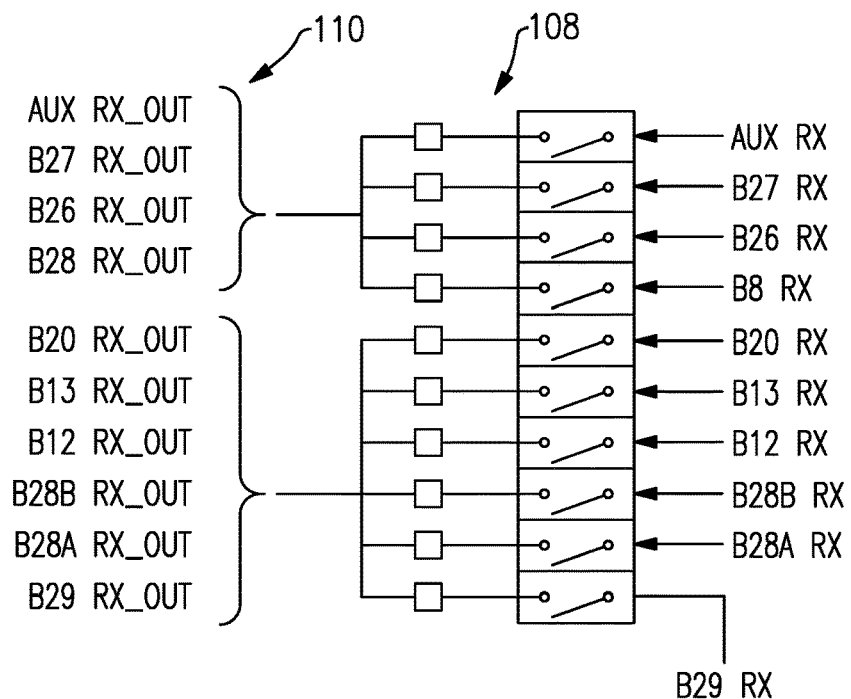
FIG. 5 shows example RF interface circuitry according to one or more embodiments.
Figure 6:
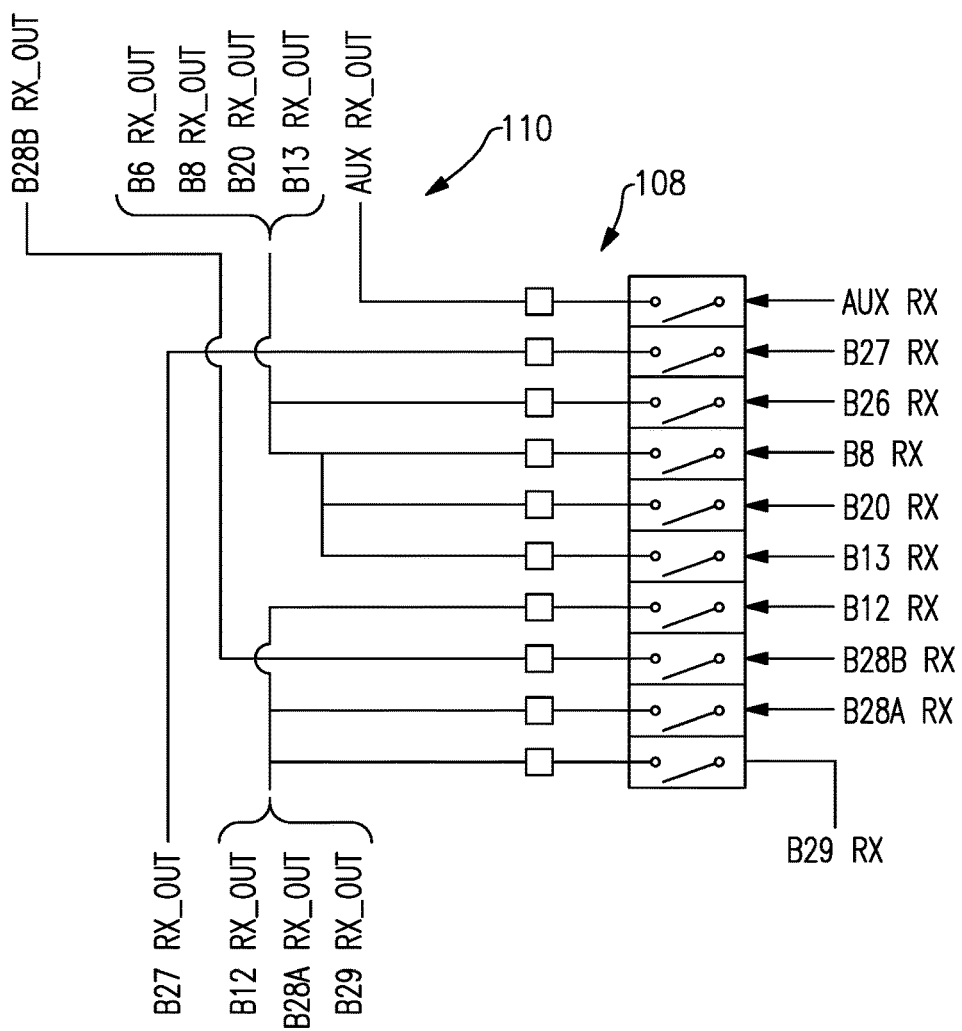
FIG. 6 shows example RF interface circuitry according to one or more embodiments.

In the example of FIG. 4, the circuit board side is shown to have signal paths that are configured to mate with the separate output pins 130 of the RX interface 108. Beyond such a mating configuration, various circuit board designs can implement different routing configurations while using the same RF module (e.g., FEM). FIGS. 5 and 6 show examples of such routing configurations that can be implemented while using the same RX interface 108 (and therefore the same RF module). The routing configurations of FIGS. 5 and/or 6 may be implemented external to the RF module associated with the RX interface 108, such as on a printed circuit board (PCB) on which the RF module is mounted or can be mounted.

FIG. 5 shows an example of a circuit board design 110 that can be implemented with the example RX interface 108 of FIG. 4. The example circuit board design 110 of FIG. 5 is configured to provide the same example RX signal routing configuration described herein in reference to FIG. 3. In FIG. 3, however, the consolidation is achieved in the RX interface (10) of the corresponding RF module. In FIG. 5, the consolidation can be achieved on the circuit board outside of the corresponding RF module.

For example, and referring to FIG. 5, the 10 example SP1T switches allow control of routing of 10 example RX inputs (B29 RX, B28A RX, B28B RX, B12 RX, B13 RX, B20 RX, B8 RX, B26 RX, B27 RX, and Aux RX) to their separate output pins. As described in reference to the example of FIG. 4, the circuit board side can include signal paths that are configured to mate with the separate output pins 130 of the RX interface 108. Such mating signal paths can be consolidated on the circuit board side into first and second common paths. For example, the signals paths on the circuit board for B29 RX, B28A RX, B28B RX, B12 RX, B13 RX, B20 can be consolidated into the first common path. Similarly, the signal paths on the circuit board for B8 RX, B26 RX, B27 RX, Aux RX can be consolidated into the second common path.

FIG. 6 shows an example of a circuit board design 110 that is different than the example of FIG. 5, but can be implemented with the same example RX interface 108 of FIG. 4. Similar to the example of FIG. 5, 10 example SP1T switches of FIG. 6 allow control of routing of 10 example RX inputs (B29 RX, B28A RX, B28B RX, B12 RX, B13 RX, B20 RX, B8 RX, B26 RX, B27 RX, and Aux RX) to their separate output pins. As described in reference to the example of FIG. 4, the circuit board side can include signal paths that are configured to mate with the separate output pins 130 of the RX interface 108.

In the example of FIG. 6, signal paths for the example bands B29 RX, B28A RX, B12 RX are shown to be consolidated to a common path. Similarly, signal paths for the example bands B13 RX, B20 RX, B8 RX, B26 RX are shown to be consolidated to a common path. Signal paths for the example bands B28B RX, B27 RX and Aux RX are shown to be routed to their respective separate paths without being consolidated.

Based on the non-limiting examples of FIGS. 5 and 6, one can see that a given RF module with the RX interface 108 can be utilized for different signal path designs on circuit boards. In addition to such flexibility in accommodating different circuit board designs, the separate switches (e.g., SP1T switches) for the RX inputs can provide advantageous performance features. For example, it is noted that in the examples of FIGS. 4-6 in which 10 separate SP1T switches are utilized to control routing of 10 example RX inputs on the RF module, when any SP1T switch is open, parasitic effect due to that switch is desirably low and it appears as an open circuit to an active path (for which the corresponding SP1T switch is closed).

As described herein, an RX interface (e.g., 108 in FIGS. 1, 2, 4-6) having one or more features as described herein can allow a single part (e.g., an RF module such as an FEM) to be utilized in a flexible manner in different ways to support different RX path mappings on circuit boards such as phone boards. As also described herein, such a desirable flexibility can be achieved at little or no performance impact to the RX path designs.

It is also noted that an RX interface having one or more features as described herein can provide flexibility in control of routing of the various RF outputs from the RF module (e.g., with independent switches for the separate output pins). Such flexibility in routing control can allow, for example, external switch content on the circuit board to be reduced or eliminated, to thereby yield significant savings in area and/or cost. In some embodiments, use of simple circuit board components such as SMDs and matching networks can be utilized in conjunction with the switching control of the RX interface to achieve effective routing of RX signals in different configurations on circuit boards while utilizing the same RF module.

Figure 7:
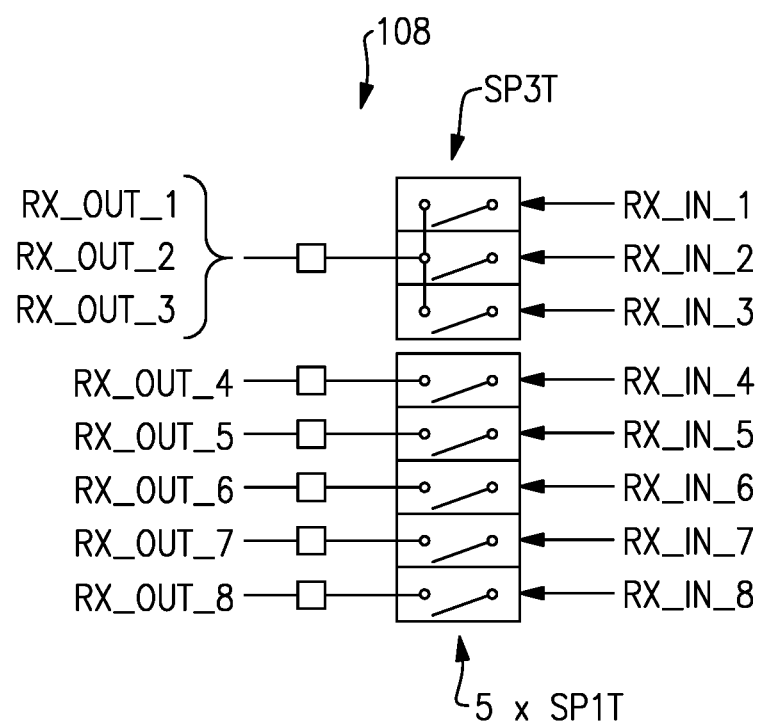
FIG. 7 shows example RF interface circuitry according to one or more embodiments.

In the examples of FIGS. 4-6, all 10 example RX inputs (B29 RX, B28A RX, B28B RX, B12 RX, B13 RX, B20 RX, B8 RX, B26 RX, B27 RX, and Aux RX) are depicted as having their respective separate output pins and SP1T switches. FIG. 7 shows that in some embodiments, an RX interface 108 can be configured so that not all RX inputs necessarily have such one-to-one I/O configuration.

In an example RX interface 108 of FIG. 7, some of the RX inputs are provided with a one-to-one I/O configuration, while other RX inputs are consolidated within the RX interface 108. For example, RX inputs RX_IN_1, RX_IN_2 and RX_IN_3 are shown to be consolidated in the RX interface 108 (e.g., by an SP3T switch) so as to be output through a common pin. RX inputs RX_IN_4, RX_IN_5, RX_IN_6, RX_IN_7 and RX_IN_8 are shown to be routed to their respective separate output pins through, for example, five SP1T switches.

Figure 8:
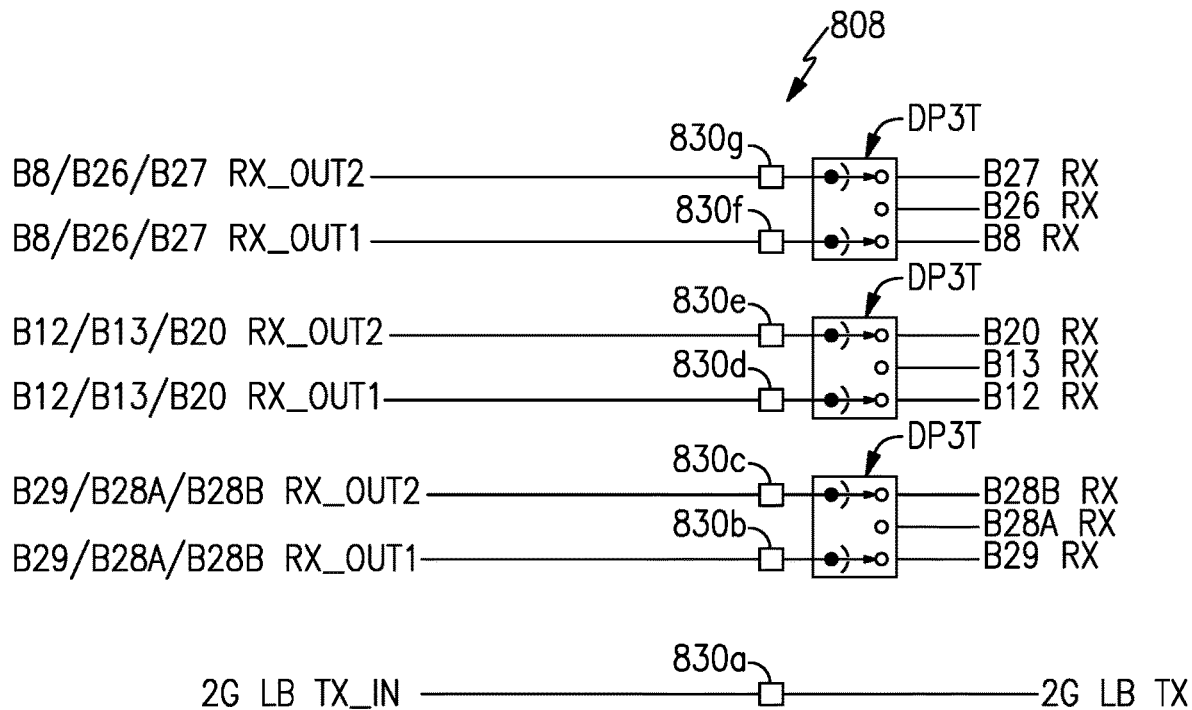
FIG. 8 shows example RF interface circuitry according to one or more embodiments.

In an example RX interface 808 of FIG. 8, one or more groups of RX inputs are consolidated using one or more double-pull triple-throw (DP3T) or other double-pull (DPXT) switches. Such a configuration may be implemented when there is a limited number of pins relative to internal signal routing. For example, limited RX (or TX) pin counts may necessitate relatively complex switches, resulting in relatively high loss. Use of DPXT switches may enable flexibility of individual bands, but may present certain disadvantages as well with respect to size and/or layout constraint/complexity inside the RF module. However, dedicated SPXT switches, as described herein, may not be compatible with certain platforms. Therefore, RF/TX interfaces providing flexible reconfiguration of port mapping may be desirable.

Figure 9:
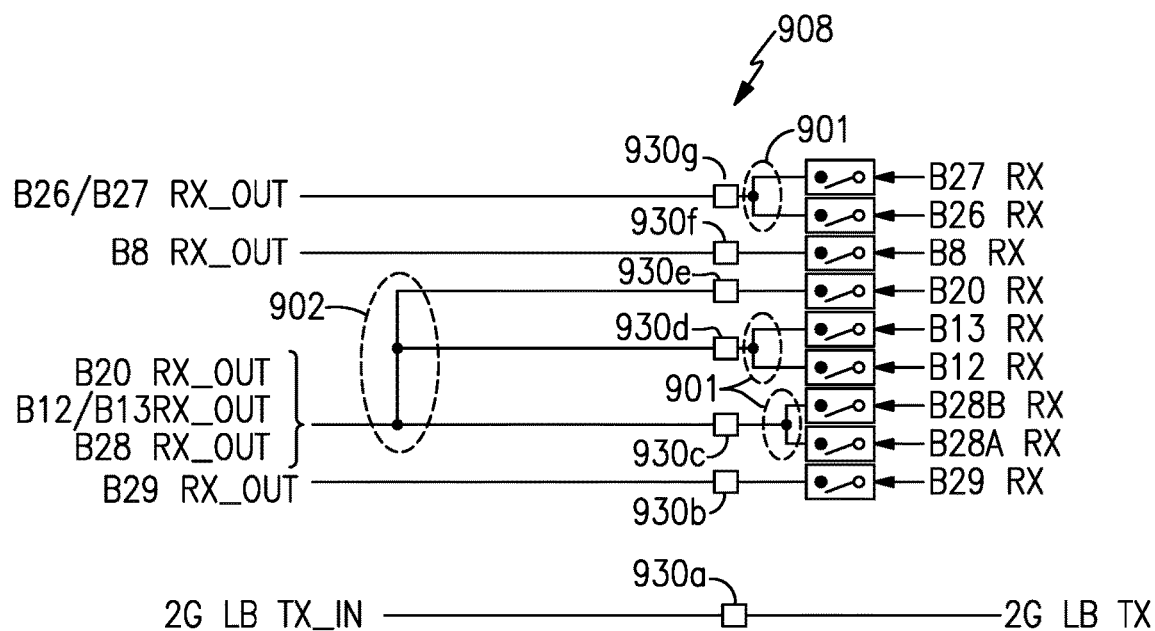
FIG. 9 shows example RF interface circuitry according to one or more embodiments.

Certain embodiments disclosed herein provide RX (or TX) interfaces that comprise switches that may be wired or coupled together in desirable combinations, inside the RF module and/or externally (e.g., on a PCB). Using hardware-programmable wire-bonding in the RX (or TX) interface, the pin-out configuration may be at least partially re-definable. Furthermore, flexible PCB layout may combine the RX (or TX) paths as desired, such that a single part may be used in many different configurations across platforms, customers and/or products. FIG. 9 shows that in some embodiments, an RX interface 908 can be configured to provide increased flexibility for a wide variety of circuit board designs. The RX interface 908 comprises a plurality of SP1T switches with hardware-programmable wire-bonding that can be flexibly connected in the RX interface 908 as needed for port mapping under, for example, limited pin-out constraints. In certain embodiments, certain switch combinations 901 may be implemented within the RX interface. Additionally or alternatively, certain switch combinations 902 may be implemented externally to the RX interface, such as on a PCB.

Transmitter Interface

Figure 10:
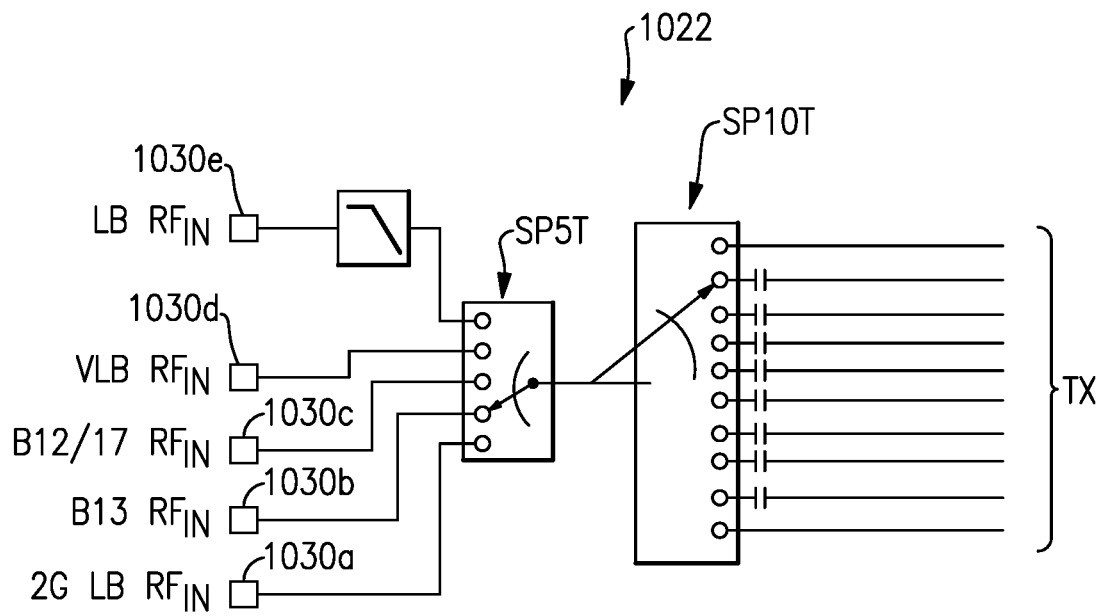
FIG. 10 shows example RF interface circuitry according to one or more embodiments.

Certain embodiments disclosed herein provide TX interfaces configured to enable flexible TX consolidation switching. As shown in FIG. 10, certain TX interfaces comprise one or more multiple-throw switches (e.g., SP5T, SP10T) designed to consolidate groups of communication bands together. FIG. 10 shows an example configuration 1022 where the example TX inputs (low-band (LB) $RF_{in}$, very-low-band (VLB) $RF_{in}$, B12/17 $RF_{in}$, B13 $RF_{in}$, 2G LB $RF_{in}$) are consolidated at a first switch (e.g., SP5T) and selectively provide to one of a plurality of TX lines via a second switch (e.g., SP10T). The various RF input signals may be received from a source external to the TX interface 1022 and/or RF module associated therewith. For example, the RF input signals may be received from a transceiver module communicatively coupled to the RF module via at least the TX interface 1022. In certain embodiments where multiple channels are provide on a port, the switches outside of the TX interface may be necessary to achieve the desired routing. The configuration of FIG. 10 provides an alternative where the switching functionality is implemented within the TX interface 1022. However, use of the multiple-throw switches of FIG. 10 may result in relatively high loss. For example, where two switches are implemented in a cascade configuration, where one switch has a 0.5 dB loss and the other has a 0.8 dB loss, the resulting loss of the combination of switches may be 1.3 dB loss.

In the example of FIG. 10, the TX input configuration of the interface 1022 matches the consolidation of the two groups of bands on the example circuit board design. In circuit board designs, however, there may be variations in, for example, number of consolidation groups, band content of a given group, etc. With such variations, the example TX interface 1022 of FIG. 10 typically cannot be utilized without at least some loss of functionality. Accordingly, the example consolidation configuration of FIG. 10 generally does not provide flexibility for use in a wide variety of RX output configurations.

Figure 11:
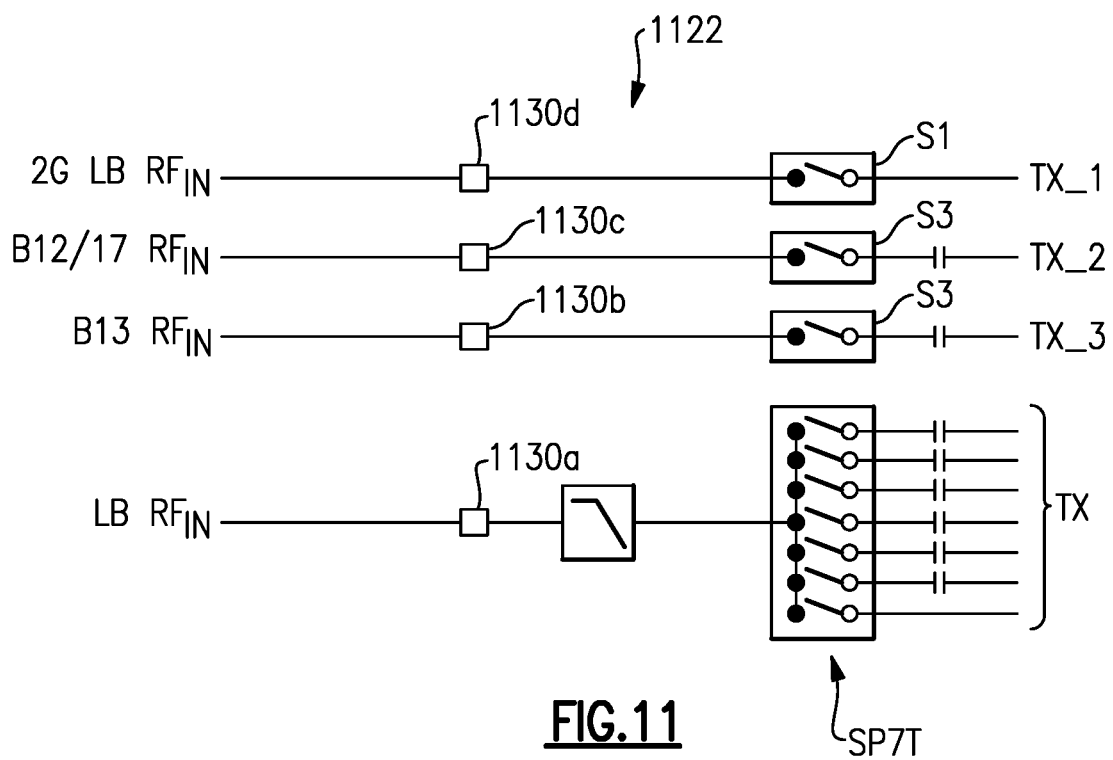
FIG. 11 shows example RF interface circuitry according to one or more embodiments.

FIG. 11 illustrates an example TX interface 1122, wherein a plurality of SP1T switches (S1, S2, S3) and a plurality of TX pins (1130a-d) can be flexibly connected outside of the TX interface 1122 for compatibility with port mapping for connection with various types of transceivers. Unlike the two-stage switch configuration of FIG. 10, the TX interface of FIG. 11 may comprise a single switch stage. For example, the TX interface 1122 may comprise a dedicated SP1T switch for each of a plurality of bands. The interface 1122 may further include a multiple-throw switch to combine and/or spread-out one or more sets of bands. With a single switch stage, the TX interface 1122 may present reduced loss relative to the configuration of the TX interface 1022 of FIG. 10.

Figure 12:
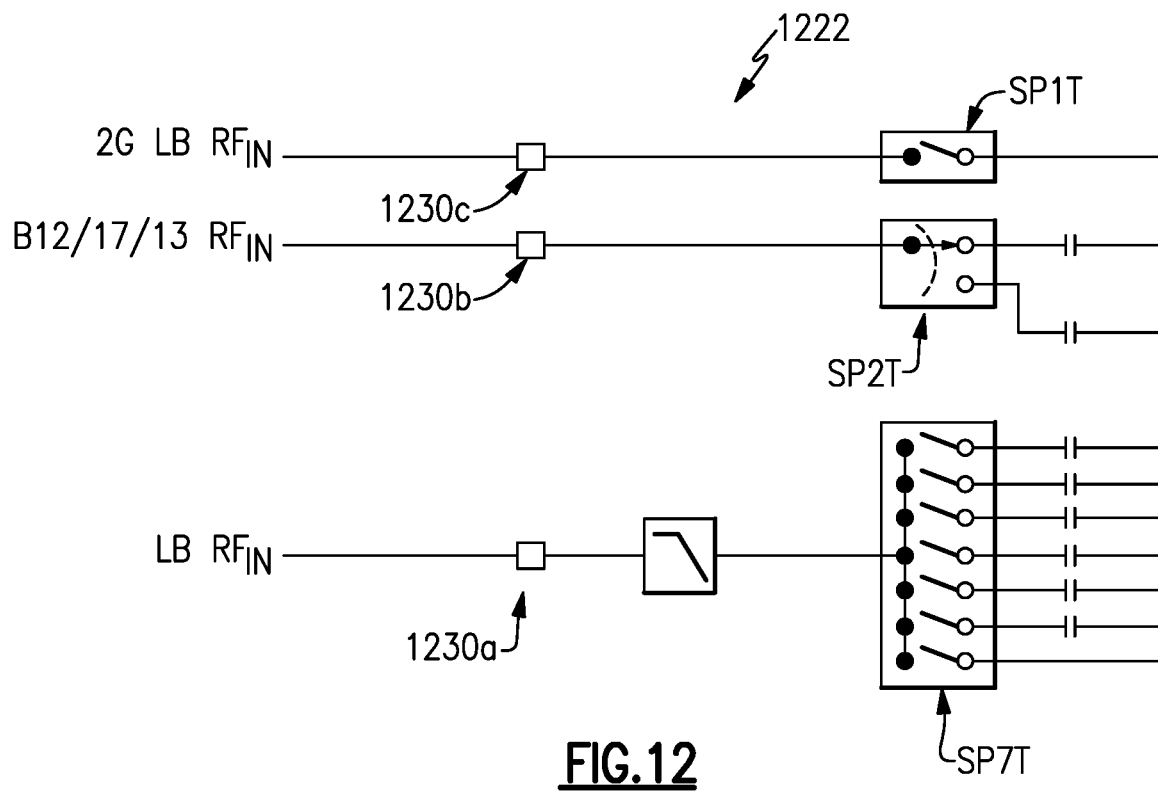
FIG. 12 shows example RF interface circuitry according to one or more embodiments.

FIG. 12 illustrates an example TX interface, wherein one or more bands are mapped to a single SP1T switch, as described above, while one or more other bands are mapped to multiple-throw switches. However, in certain embodiments, it may be desirable to have flexibility for connecting or not connecting a given pin to a single-throw switch or a multiple-throw switch. Limited TX (or RX) pin counts may necessitate relatively complex switches and higher loss on multiple-throw switches. That is, while DPXT or other switches may provide advantageous flexibility of individual bands, certain disadvantages in size and/or layout constraint/complexity inside the RF module may make such configurations undesirable. However, dedicated SPXT switches for certain bands may not provide compatibility for some platforms/products. Therefore, the ability to allow flexible reconfiguration of the TX (or RX) port mapping, etc. To such end, certain embodiments of RF interfaces disclosed herein are configured to enable hardware-programmable TX switching.

Figure 13:
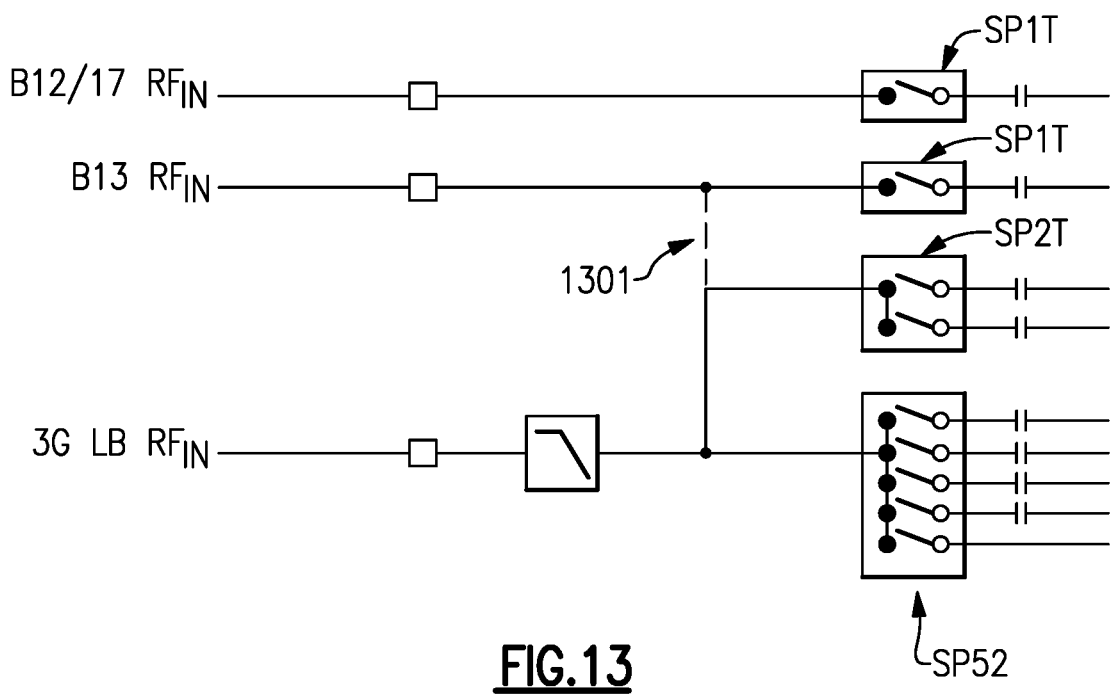
FIG. 13 shows example RF interface circuitry according to one or more embodiments.

FIG. 13 shows an example of a TX interface 1222 that can be implemented in accordance with embodiments disclosed herein. The routing of FIG. 13 may allow for making a connection between one internal input line to another, thereby providing selectability between a first switch (e.g., SP2T) and a second switch (e.g., SP1T) for one or more bands. While the selectable connection is shown as a hard-wired connection internal to the RF interface/module, switch selectability may be provided external to the RF interface and/or module. By utilizing switches that can be wired together in various combinations as needed, either inside the RF module or on a PCB to which the RF module may be mounted, may allow for more broad compatibility across platforms/products. With configurable switch wiring internal to the RF module, the pin-out of the RF module at the TX (or RX) interface may be effectively redefinable. External configurable switch wiring on, for example, a PCB, may allow for combination of TX (or RX) signal paths, as required, such that the single module may be usable across different platforms/products.

As described herein, an RX interface (e.g., 108 in FIGS. 1, 2, 4-6) having one or more features as described herein can allow a single part (e.g., an RF module such as an FEM) to be utilized in a flexible manner in different ways to support different RX and/or TX path mappings on circuit boards, such as phone boards. As also described herein, such a desirable flexibility can be achieved at little or no performance impact to the RX/TX path designs.

It is also noted that an RX interface or TX interface having one or more features as described herein can provide flexibility in control of routing of the various RF outputs from the RF module (e.g., with independent switches for the separate output pins). Such flexibility in routing control can allow, for example, external switch content on the circuit board to be reduced or eliminated, to thereby yield significant savings in area and/or cost. In some embodiments, use of simple circuit board components such as SMDs and matching networks can be utilized in conjunction with the switching control of the RX or TX interface to achieve effective routing of RX/TX signals in different configurations on circuit boards while utilizing the same RF module. In some embodiments, either or both of RX and TX interfaces can include one or more features as described herein. Furthermore, the foregoing RF applications can also include programmable switching functionalities implemented for either or both of RX and TX interfaces.

In some implementations, an architecture, device and/or circuit having one or more features described herein can be included in an RF device such as a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless access point, a wireless base station, etc. Although described in the context of wireless devices, it will be understood that one or more features of the present disclosure can also be implemented in other RF systems such as base stations.

Wireless Device Implementation

Figure 14:
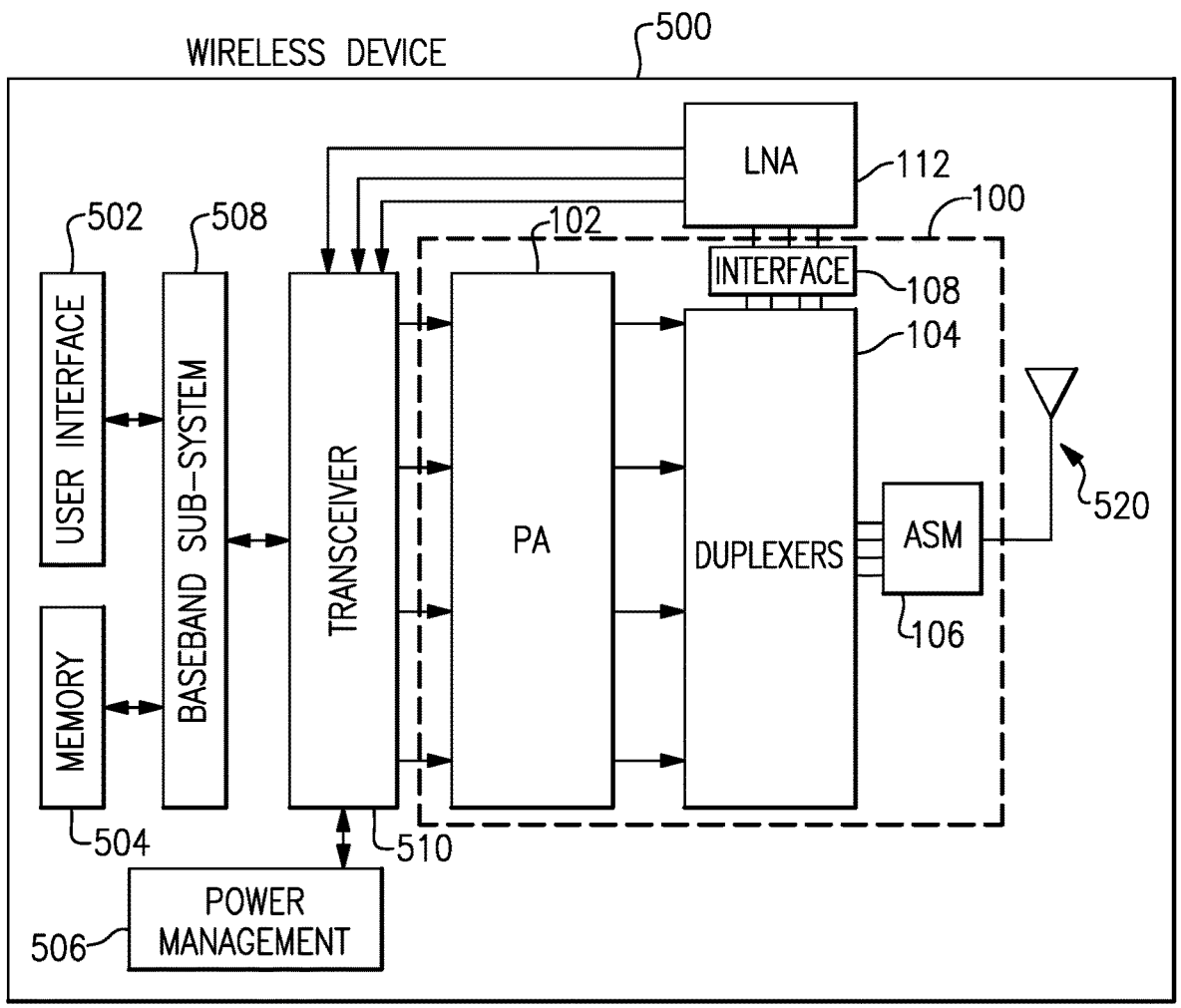
FIG. 14 depicts an example wireless device according to one or more embodiments.

FIG. 14 depicts an example wireless device 500 having one or more advantageous features described herein. In some embodiments, such advantageous features can be implemented in a front-end (FE) module 100 having one or more features as described herein. As described herein, such an FEM can include an RX interface 108 that can provide flexibility in how a given FEM can be utilized for a wide variety of signal routing designs on circuit boards such as phone boards. In some embodiments, such an FEM can include more or less components than as indicated by the dashed box.

PAs 102 in the FEM 100 can receive their respective RF signals from a transceiver 510 that can be configured and operated to generate RF signals to be amplified and transmitted, and to process received signals. The transceiver 510 is shown to interact with a baseband sub-system 508 that is configured to provide conversion between data and/or voice signals suitable for a user and RF signals suitable for the transceiver 510. The transceiver 510 is also shown to be connected to a power management component 506 that is configured to manage power for the operation of the wireless device 500. Such power management can also control operations of the baseband sub-system 508 and other components of the wireless device 500.

The baseband sub-system 508 is shown to be connected to a user interface 502 to facilitate various input and output of voice and/or data provided to and received from the user. The baseband sub-system 508 can also be connected to a memory 504 that is configured to store data and/or instructions to facilitate the operation of the wireless device, and/or to provide storage of information for the user.

In the example wireless device 500, the front-end module 300 can include an antenna switch module (ASM) 106. Such an ASM can provide signal routing control between an antenna 520 and a group of duplexers 104. Amplified RF signals to be transmitted can be routed from the PAs 102 to the antenna 520 through the duplexers 104 and the ASM 106. RF signals received through the antenna can be routed to respective LNA(s) 112 through the ASM 106, the duplexers 104, and the RX interface 108. Amplified signals from the LNA(s) 112 are shown to be routed to the transceiver 510.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1.

TABLE 1

| Band | Mode | TX Frequency Range (MHz) | RX Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B33 | TDD | 1,900-1,920 | 1,900-1,920 |

TABLE 1-continued

| Band | Mode | TX Frequency Range (MHz) | RX Frequency Range (MHz) |
|---|---|---|---|
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio-frequency module comprising:
   a plurality of radio-frequency signal inputs;
   a plurality of radio-frequency signal outputs;
   a first single-pole single-throw switch connected between a first input of the plurality of radio-frequency signal inputs and a first output of the plurality of radio-frequency signal outputs;
   a second single-pole single-throw switch connected between a second input of the plurality of radio-frequency signal inputs and a second output of the plurality of radio-frequency signal outputs;
   a third single-pole single-throw switch connected between a third input of the plurality of radio-frequency signal inputs and a third output of the plurality of radio-frequency signal outputs; and
   a single-pole multiple-throw switch including a plurality of throws connected to respective ones of a subgroup of the plurality of radio-frequency signal inputs and further including a single pole connected to a fourth output of the plurality of radio-frequency signal outputs.

2. The radio-frequency module of claim 1 wherein the radio-frequency module is a front-end module.

3. The radio-frequency module of claim 1 wherein the radio-frequency module is a receiver interface.

4. The radio-frequency module of claim 1 further comprising a first multiple-pole multiple-throw switch connected between a first subgroup of the plurality of radio-frequency signal inputs and a first subgroup of the plurality of radio-frequency signal outputs.

5. The radio-frequency module of claim 4 further comprising a second multiple-pole multiple-throw switch connected between a second subgroup of the plurality of radio-frequency signal inputs and a second subgroup of the plurality of radio-frequency signal outputs.

6. The radio-frequency module of claim 1 wherein each of the plurality of radio-frequency signal inputs is coupled to a respective band pass filter of a plurality of band pass filters.

7. The radio-frequency module of claim 1 wherein the plurality of radio-frequency signal inputs consists of a first number of inputs and the plurality of radio-frequency signal outputs consists of a second number of outputs, the first number being greater than the second number.

8. A transmitter interface module comprising:
   a plurality of radio-frequency signal inputs;
   a plurality of radio-frequency signal outputs;
   a first single-pole single-throw switch connected to a first output of the plurality of radio-frequency signal outputs;
   a first internal coupling trace electrically coupling a first input of the plurality of radio-frequency signal inputs to a pole of the first single-pole single-throw switch;
   a first multiple-throw switch connected at least to second and third outputs of the plurality of radio-frequency signal outputs;
   a second internal coupling trace electrically coupling a second input of the plurality of radio-frequency signal inputs to a pole of the first multiple-throw switch; and
   an internal hardware programmable connector configured to selectably wire the first internal coupling trace to the second internal coupling trace, thereby providing flexibility for internally connecting the first input of the plurality of radio-frequency signal inputs to the pole of the first single-pole single-throw switch or the pole of the first multiple-throw switch.

9. The transmitter interface module of claim 8 further comprising a second single-pole single-throw switch connected to a fourth output of the plurality of radio-frequency signal outputs.

10. The transmitter interface module of claim 8 further comprising a second multiple-throw switch coupled to a second subgroup of the plurality of radio-frequency signal outputs.

11. A wireless device comprising:
a transceiver configured to process radio-frequency signals;
a radio-frequency module in communication with the transceiver, the radio-frequency module including an interface including a single-pole, multiple-throw switch coupled at a pole to an antenna signal transmission path and at each of a quantity M of throws to a separate one of M signal paths, an interface module including M inputs coupled to the M signal paths, respectively, and a quantity N outputs, each of the quantities M and N greater than 1, the interface module including a first signal path connected between a first input of the M inputs and a first output of the N outputs via a first single-pole single-throw switch, a second signal path connected to a second input of the M inputs and including a second single-pole single-throw switch, and a third signal path connected to a third input of the M inputs and including a third single-pole single-throw switch, the second and third single-pole single-throw switches being associated with hardware-programmable wire-bonding, such that the second and third signal paths can be selectively coupled together to a second output of the N outputs within the interface using the hardware-programmable wire-bonding; and
an antenna in communication with the radio-frequency module, the antenna configured to receive the radio-frequency signals.

12. The wireless device of claim 11 wherein the radio-frequency module is a front-end module.

13. The wireless device of claim 11 wherein the quantity M is greater than or equal to the quantity N.

14. The wireless device of claim 11 wherein the quantity M is equal to the quantity N.

15. The wireless device of claim 11 further including a circuit board having the radio-frequency module mounted thereon.

16. The wireless device of claim 15 wherein the circuit board further includes a layout of signal paths configured to mate with at least some of the N outputs of the interface module, the layout of signal paths including at least one consolidation of two or more signal paths connected to their respective ones of the N outputs.

\* \* \* \* \*